United States Patent
Khoo et al.

(10) Patent No.: US 9,789,763 B1
(45) Date of Patent: Oct. 17, 2017

(54) SYSTEMS AND METHODS FOR INFOTAINMENT SYSTEM STARTUP

(71) Applicant: Toyota Motor Engineering & Manufacturing North America, Inc., Erlanger, KY (US)

(72) Inventors: Wilson-Boon Siang Khoo, Allen, TX (US); Ming Michael Meng, Novi, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/138,323

(22) Filed: Apr. 26, 2016

(51) Int. Cl.
*B60K 35/00* (2006.01)

(52) U.S. Cl.
CPC ...... *B60K 35/00* (2013.01); *B60K 2350/1004* (2013.01)

(58) Field of Classification Search
CPC .................. B60K 35/00; B60K 2350/1004
See application file for complete search history.

(56) References Cited

U.S. PATENT DOCUMENTS

| | | | |
|---|---|---|---|
| 9,159,232 B2 * | 10/2015 | Ricci | G06F 9/54 |
| 2003/0182360 A1 | 9/2003 | Mocek et al. | |
| 2005/0283284 A1 * | 12/2005 | Grenier | G01C 21/26 |
| | | | 701/31.4 |
| 2006/0026568 A1 * | 2/2006 | Wiltamuth | G06F 8/71 |
| | | | 717/122 |
| 2007/0164604 A1 * | 7/2007 | Bale | B60G 17/0195 |
| | | | 303/20 |
| 2009/0164473 A1 | 6/2009 | Bauer | |
| 2010/0222939 A1 | 9/2010 | Namburu et al. | |
| 2014/0222341 A1 * | 8/2014 | Rathi | G01C 21/362 |
| | | | 701/538 |
| 2015/0039877 A1 | 2/2015 | Hall et al. | |
| 2015/0286219 A1 * | 10/2015 | Reichel | G08G 1/0965 |
| | | | 701/23 |
| 2015/0317484 A1 * | 11/2015 | Bowden | G06F 21/62 |
| | | | 726/26 |
| 2016/0005241 A1 * | 1/2016 | Soles | G08B 13/126 |
| | | | 701/49 |

(Continued)

FOREIGN PATENT DOCUMENTS

| CN | 103645916 | 3/2014 |
|---|---|---|
| WO | 2014168555 | 10/2014 |

*Primary Examiner* — Rodney Butler
(74) *Attorney, Agent, or Firm* — Dinsmore & Shohl LLP

(57) ABSTRACT

Systems and methods for infotainment system startup are provided. One embodiment of a method includes determining a user-defined startup priority associated with a plurality of vehicle service classifications, where the plurality of vehicle service classifications are associated with a plurality of respective vehicle services. Embodiments also include receiving an indication of vehicle startup, determining whether at least two of the plurality of vehicle services in at least two of the plurality of vehicle service classifications are to be activated in response to vehicle startup, and in response to determining that at least two of the plurality of vehicle services are to be activated in response to vehicle startup, determining a startup order of the plurality of vehicle services, based on the user-defined startup priority. Embodiments also include initiating startup of the plurality of vehicle services according to the startup order.

20 Claims, 6 Drawing Sheets

(56) References Cited

U.S. PATENT DOCUMENTS

| | | | |
|---|---|---|---|
| 2016/0066013 A1* | 3/2016 | Li | H04N 21/2541 |
| | | | 725/75 |
| 2016/0104328 A1* | 4/2016 | Chen | G07C 5/0858 |
| | | | 701/31.5 |
| 2016/0321080 A1* | 11/2016 | Cepuran | G06F 9/4401 |

* cited by examiner

US 9,789,763 B1

SYSTEMS AND METHODS FOR INFOTAINMENT SYSTEM STARTUP

TECHNICAL FIELD

Embodiments described herein generally relate to systems and methods for infotainment system startup and, more specifically, to embodiments that determine startup conflicts and priorities of vehicle services.

BACKGROUND

Many of today's vehicles include a plurality of different content systems, such as terrestrial radio, satellite radio, universal serial bus (USB) input, wireless input, navigation, and the like. When the vehicle starts, these non vehicle systems typically start up based on a predetermined sequence. While the vehicle services may eventually start, the user often is forced to wait until the predetermined sequence starts the desired service. As an example, if the user desires to listen to Bluetooth audio, but the predetermined sequence starts the Bluetooth system last, the user may miss the desired content. Accordingly, a need exists in the industry.

SUMMARY

Systems and methods for infotainment system startup are provided. One embodiment of a method includes determining a user-defined startup priority associated with a plurality of vehicle service classifications, where the plurality of vehicle service classifications are associated with a plurality of respective vehicle services. Embodiments also include receiving an indication of vehicle startup, determining whether at least two of the plurality of vehicle services in at least two of the plurality of vehicle service classifications are to be activated in response to vehicle startup, and in response to determining that at least two of the plurality of vehicle services are to be activated in response to vehicle startup, determining a startup order of the plurality of vehicle services, based on the user-defined startup priority. Embodiments also include initiating startup of the plurality of vehicle services according to the startup order.

In another embodiment, a system for infotainment system startup includes an infotainment system that provides content to a vehicle, where the infotainment system comprises at least one of the following for receiving the content: a wireless communication interface and a wired communication interface. Some embodiments also include a vehicle computing device for the vehicle that stores logic that, when executed by a processor, causes the system to determine a plurality of vehicle services to initiate at vehicle startup, determine a user-defined startup priority associated with the plurality of vehicle services, and receive an indication of vehicle startup. In some embodiments, the logic may cause the system to determine whether there is a conflict regarding startup of the plurality of vehicle services and, in response to determining that there is a conflict, determine a startup order of the plurality of vehicle services to overcome the conflict, where the startup order is based on the user-defined startup priority. Some embodiments may initiate startup of the plurality of vehicle services according to the startup order.

In yet another embodiment, a system includes an infotainment system that provides a plurality of current vehicle services for a vehicle and a vehicle computing device that is coupled to the infotainment system. The vehicle computing device may store logic that, when executed by a processor, causes the system to communicate with a remote computing device to determine a plurality of past vehicle services that was previously utilized by a user, and determine, from the plurality of past vehicle services, the plurality of current vehicle services to initiate at vehicle startup. In some embodiments, the logic causes the system to determine a user-defined startup priority associated with the plurality of current vehicle services, determine whether there is a conflict regarding startup of the plurality of current vehicle services, and in response to determining that there is a conflict, determine a startup order of the plurality of current vehicle services to overcome the conflict, where the startup order is based on the user-defined startup priority. Some embodiments may initiate startup of the plurality of current vehicle services according to the startup order.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for providing infotainment system startup. Some embodiments relate to providing a vehicle user with a customized vehicle experience by providing the services he/she desires first. These embodiments allow user settings to be received by the vehicle from a remote computing device or preset on the infotainment system of the vehicle. Embodiments may intelligently determine which of a plurality of vehicle services are desired when user first steps into the vehicle and allow those systems to start first so the vehicle user does not have to wait to use the desired services.

Accordingly, embodiments described herein may facilitate communication between a mobile device, a remote computing device (such as a device on a radio access network, a smart center, etc.), and a vehicle computing device (which may be coupled to and/or include an infotainment system). This allows these embodiments to obtain the most recent audio source information, navigation route (if navigation is available), and/or other content. When the vehicle user reenters the vehicle (or enters another vehicle), that vehicle may start, based on last services used and/or based on other user preference.

Some embodiments may also provide a user option for the user to provide preference data to determine an order of starting services of the infotainment system. As an example, the user may input a preference that Bluetooth audio has priority over other services. If the user leaves the vehicle and both the Bluetooth audio and the navigation are operating, the vehicle (or the next vehicle the user enters) may prioritize that Bluetooth is activated first, followed by navigation, followed by the other services (if any). The systems and methods for infotainment system startup, incorporating the same will be described in more detail, below.

Figure 1:
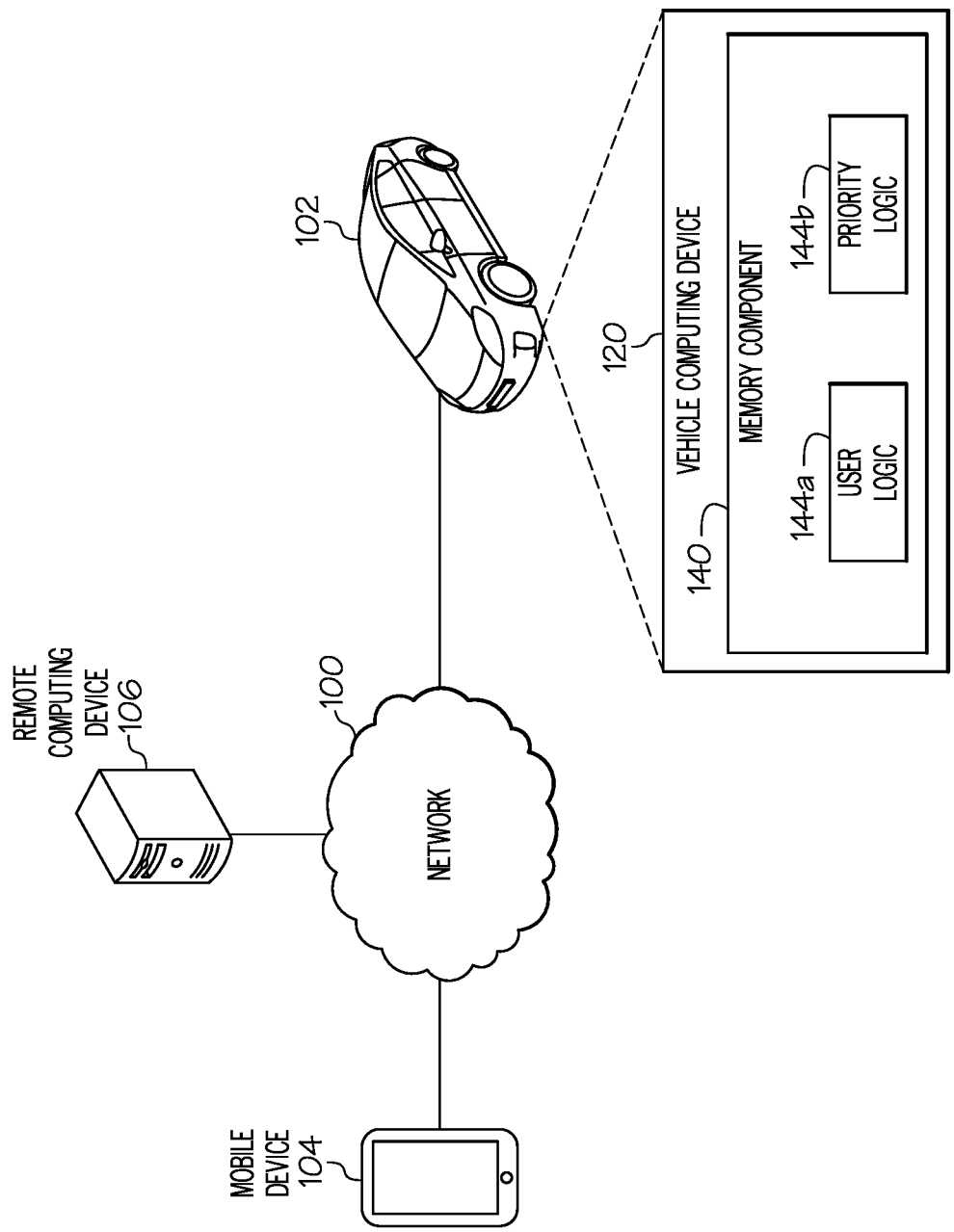
FIG. 1 depicts a communication environment for infotainment system startup, according to embodiments described herein.

Referring now to the drawings, FIG. 1 depicts a communication environment for infotainment system startup, according to embodiments described herein. As illustrated, the communication environment may include a network 100, a vehicle 102, a mobile device 104, and a remote computing device 106. The network 100 may include hardware and/or software for facilitating communication among devices and thus may include a wide area network (such as the internet, cellular communication network, a satellite network, etc.) and/or a local area network (such as Ethernet, Wireless Fidelity, Bluetooth, USB, Zigbee, etc.).

Additionally, the vehicle 102 may be coupled to the network 100 and may include a vehicle computing device 120. The vehicle computing device 120 may include a memory component 140, which stores user logic 144a, startup priority logic 144b, and/or other components as described in FIG. 7. The user logic 144a may be configured to cause the vehicle computing device 120 to determine a user that is using the vehicle 102 and/or provide one or more user interfaces described herein. The startup priority logic 144b may cause the vehicle computing device 120 to determine a priority of vehicle services and determine a startup sequence, based on that priority.

The mobile device 104 is also coupled to the network 100 and may be configured to provide one or more user interfaces, as well as communicate user data, priority data, and/or other data to the vehicle computing device 120 and/or the remote computing device 106. The mobile device 104 may be configured as a smart phone, tablet, laptop computer, personal computer, key fob, and/or other device for performing the functionality described herein. Similarly, the remote computing device 106 is also coupled to the network 100 and may be configured as a radio access network, smart center, and/or other type of computing device. Accordingly, while the remote computing device 106 is depicted as a single server, this is just an example. Depending on the embodiment, the remote computing device 106 may represent a plurality of different servers, computers, etc. located and for performing one or more functions.

Accordingly, embodiments described herein utilize the vehicle computing device 120, the mobile device 104, and/or the remote computing device 106 for setting startup priorities and utilizing the user-defined startup priority to startup non-essential and/or other vehicle services of the vehicle 102. As described in more detail below, the user may utilize the mobile device 104 or the vehicle computing device 120 for setting the priorities. Additionally, when the user enters the vehicle 102, the mobile device 104 may communicate an identifier to the vehicle computing device 120 to identify the user. A determination of the services that the user last used may be made. A determination may also be made regarding whether there is a startup conflict with those services. If so, the user-defined startup priority may be utilized to determine which service to start first. After the conflict is resolved a default startup order may be applied to the remaining infotainment services.

Figure 2:
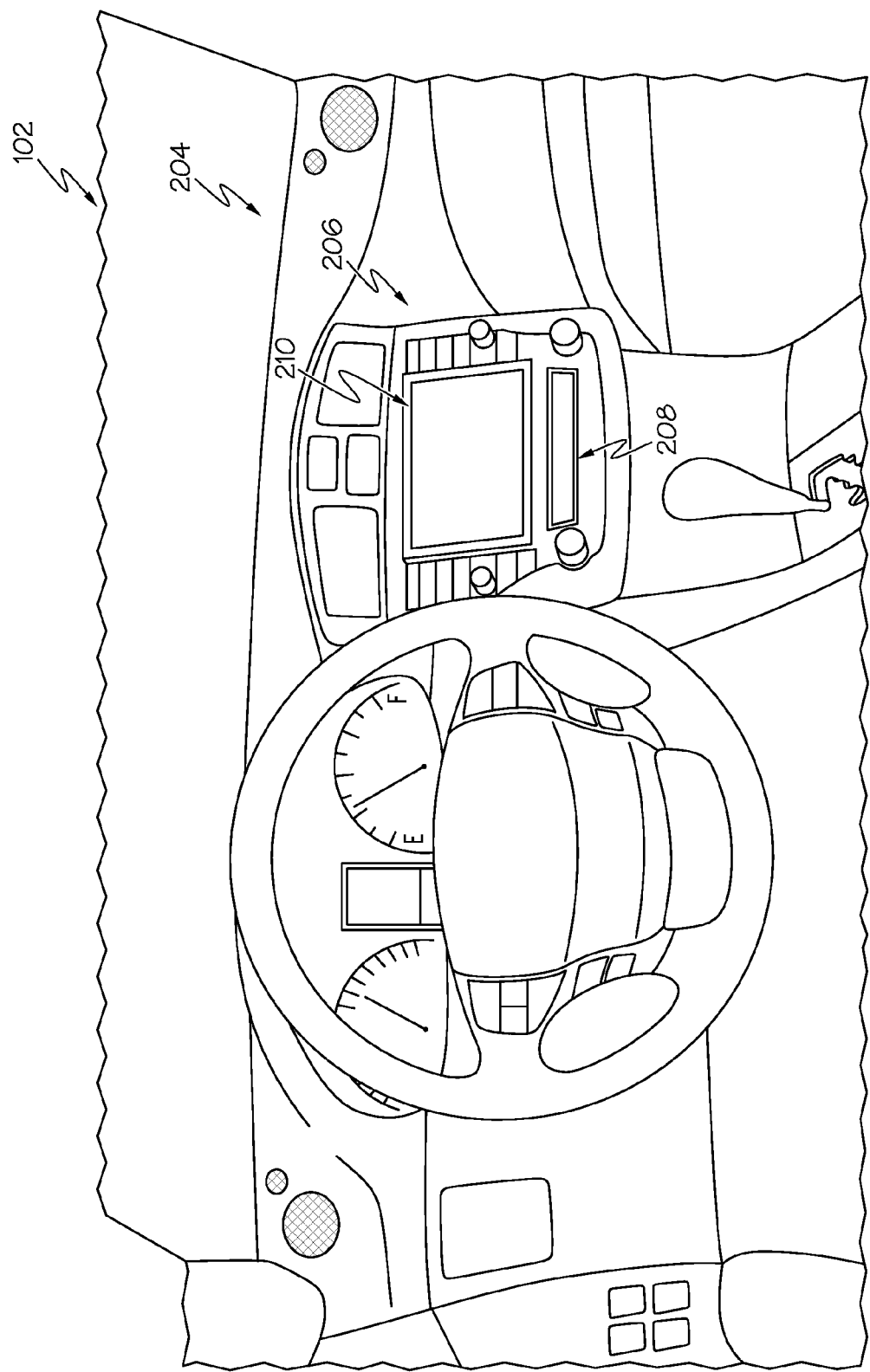
FIG. 2 depicts a vehicle interior for providing an infotainment system, according to embodiments described herein.

FIG. 2 depicts a vehicle interior 204 for providing an infotainment system, according to embodiments described herein. As illustrated, the vehicle interior 204 may include an infotainment system that includes a radio tuner 206, a disc player 208, and a display 210 for providing an in-vehicle content service; a USB port (and/or other wired communication interface) for providing a wired content service, a Bluetooth port (and/or other wireless communication interface) for providing a wireless content service; and a navigation system for providing a navigation service, etc. As described above, infotainment system may be configured to provide the user with navigation services, radio, internet radio, and/or other content. When the vehicle 102 is started, the infotainment system may be configured to start at least a portion of the services, based on past user actions.

As an example, if the user was listening to terrestrial radio and was operating the navigation system, when the user turns off the vehicle 102 and/or exits the vehicle 102, the vehicle computing device 120 may store data related to those services that were used at the time the vehicle 102 (and/or the infotainment system) was shut off. Accordingly, when the user reenters (or restarts) the vehicle 102, the vehicle computing device 120 may cause the infotainment system to start those services prior to starting services that were not previously being utilized. Additionally, as the user was operating two of the services, the vehicle computing device 120 may determine a startup order of those two services, based on a previously determined user priority. The user may specify a priority and/or a priority may be inferred from past user actions. Based on the priority, the services may be sequentially started.

The table below depicts an example startup scenario that may be utilized, where X indicates that a service is not being utilized, 0 indicates that a services is running, 1 indicates that a service is started first, and 2 indicates a service started second. Also illustrated in Table 1 are the service classifications of navigation and media. In Table 1, the navigation classification includes the navigation service and the media classification includes USB, radio, Bluetooth, and disc.

TABLE 1

| Priority | Last Mode | | | | | Now | | | | |
| --- | --- | --- | --- | --- | --- | --- | --- | --- | --- | --- |
| | USB | Radio | BT | CD | Navi | USB | Radio | BT | CD | Navi |
| Navi | X | X | X | X | X | | | Default Startup (DS) | | |
| Navi | 0 | X | X | X | X | 1 | | DS | | |
| Navi | X | 0 | X | X | X | DS | 1 | DS | | |
| Navi | X | X | 0 | X | X | DS | | 1 | | DS |
| Navi | X | X | X | 0 | X | | DS | | 1 | DS |
| Navi | 0 | X | X | X | 0 | 2 | | DS | | 1 |
| Navi | X | 0 | X | X | 0 | DS | 2 | DS | | 1 |
| Navi | X | X | 0 | X | 0 | DS | | 2 | DS | 1 |
| Navi | X | X | X | 0 | 0 | | DS | | 2 | 1 |
| Media | X | X | X | X | X | | | DS | | |
| Media | 0 | X | X | X | X | 1 | | DS | | |
| Media | X | 0 | X | X | X | DS | 1 | | DS | |
| Media | X | X | 0 | X | X | DS | | 1 | DS | |
| Media | 0 | X | X | X | 0 | 1 | | DS | | 2 |

TABLE 1-continued

| | Last Mode | | | | | Now | | | | |
|---|---|---|---|---|---|---|---|---|---|---|
| Priority | USB | Radio | BT | CD | Navi | USB | Radio | BT | CD | Navi |
| Media | X | 0 | X | X | 0 | DS | 1 | | DS | 2 |
| Media | X | X | 0 | X | 0 | DS | | 1 | DS | 2 |
| Media | X | X | X | 0 | 0 | | DS | | 1 | 2 |

Figure 3A:
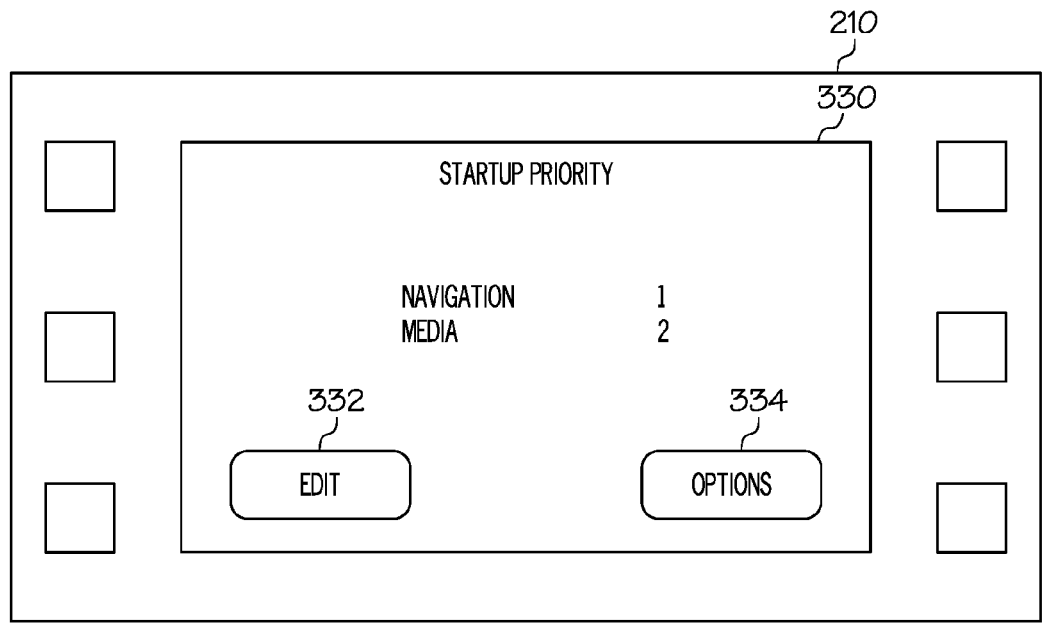
FIGS. 3A and 3B depict user interfaces for providing options associated with an infotainment system, according to embodiments described herein.
Figure 3B:
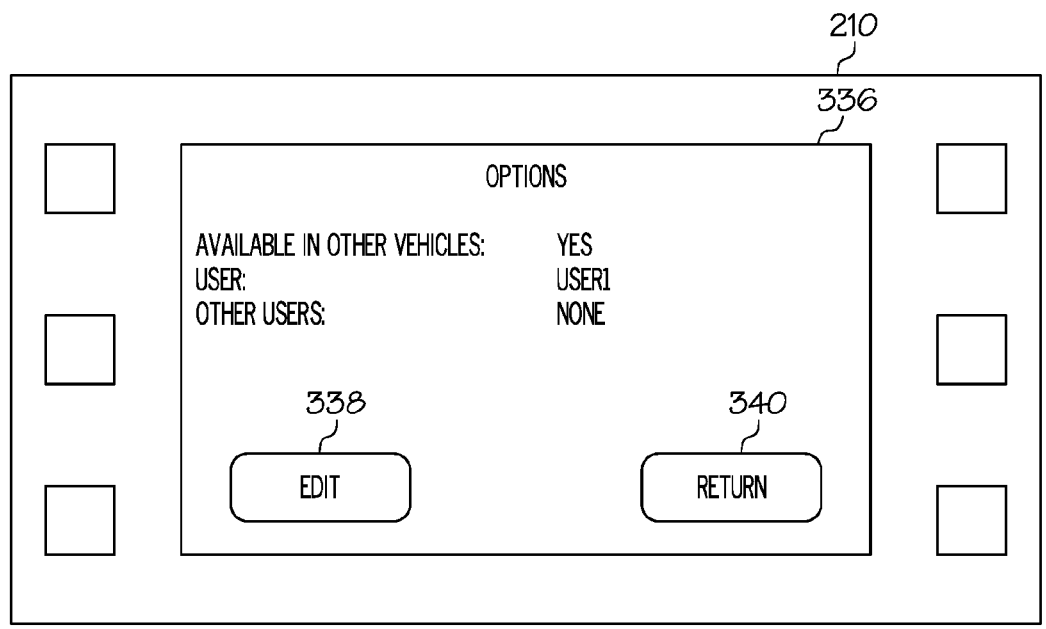

FIGS. 3A and 3B depict user interfaces for providing options associated with an infotainment system, according to embodiments described herein. As illustrated in FIG. 3A, the display 210 may provide a user interface 330 that provides the startup priority of a plurality of services for the vehicle 102. The user interface 330 may indicate whether the media services have priority or whether the navigation services have priority. As discussed above, the startup priority may be determined by a user selection, past user action, and/or may be preset. Also included is an edit option 332 for editing the startup priority and/or the list of services (such as if the user adds a new service). An options option 334 may also be included for providing additional settings associated with the infotainment system.

As illustrated in FIG. 3A, the priority is currently set such that navigation has startup priority over any of the media services. Referring back to Table 1 above, based on the services being utilized when the user last left the vehicle 102, the top half of the table may be referred to determine the startup priority. As an example, if the user last left the vehicle 102 with the navigation and the Bluetooth media running, the navigation would start first, followed by the Bluetooth media, with the remaining services starting up according to a default sequence.

It should also be understood that embodiments may also be configured to interface with a mobile interface solution, such as Apple™ CarPlay™, MirrorLink™, Android™ Auto, and the like. In these embodiments, the mobile device 104 may link with the vehicle 102 to provide one or more interfaces and/or functions from the mobile device 104 in the infotainment system. Accordingly, these embodiments may be configured to automatically startup the service (such as Bluetooth and/or USB) associated with the mobile interface solution first, with other services being granted a lower priority. Depending on the embodiment, the mobile interface may always launch first with priority of the other services being launched according Table 1. Similarly, some embodiments may simply add another service classification for which priority may be determined.

Additionally, FIG. 3B depicts a user interface 336 that provides data related to whether the startup priority functionality is available on other vehicles. Also provided is a list of users that are authorized to utilize the startup priority functionality is also provided. An edit option 338 is provided for editing these settings. A return option 340 is also provided for returning to the user interface 330.

As is evident, while embodiments may utilize the startup priority functionality described herein on a single vehicle, some embodiments may be configured for utilizing the startup priority across a plurality of vehicles. As an example, the vehicle computing device 120 may send the startup priority data, last used services, a user identifier, etc. related to a plurality of past vehicle services from a previous vehicle to the remote computing device 106. Thus, when the user enters a different vehicle, that vehicle computing device 120 communicates with the mobile device 104 to receive the user identifier. That vehicle computing device 120 may then retrieve the plurality of past vehicle services and the startup priority data for implementation in the current vehicle as a plurality of current vehicle services.

Figure 4B:
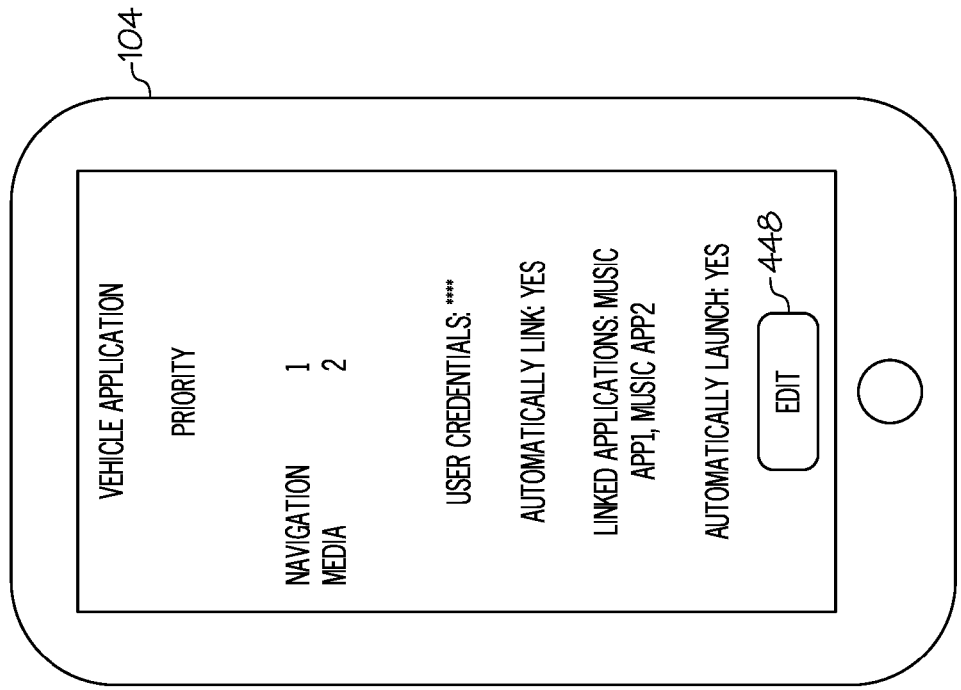
FIGS. 4A and 4B depict user interfaces of a mobile device for communicating data related to startup of an infotainment system, according to embodiments described herein.
Figure 4A:
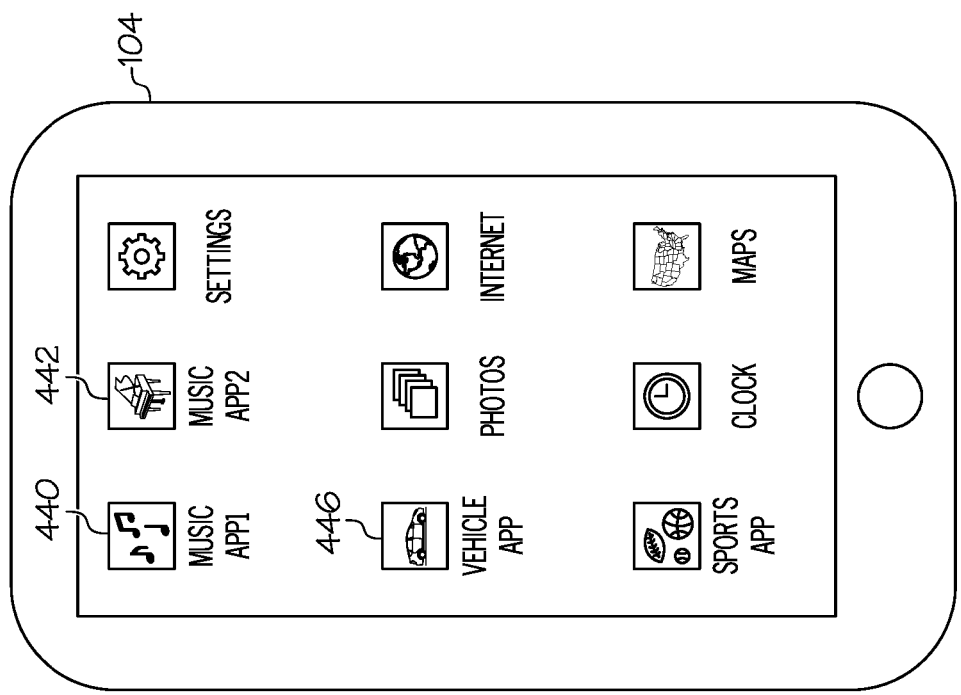

FIGS. 4A and 4B depict user interfaces of the mobile device 104 for communicating data related to startup of an infotainment system, according to embodiments described herein. Specifically, some embodiments may be configured to provide an application that runs on the mobile device 104. The application may receive and/or cause the mobile device 104 to store data associated with a user's most recently used services, as well as preference data and priority data regarding the services. The mobile device 104 may send data to the remote computing device 106 (such as a radio access network, smart center, etc.), which contains information of a manner in which the infotainment system should start. The remote computing device 106 may verify that a valid request has been received and may check its database for the vehicle information. The remote computing device 106 may additionally send the request back with the vehicle information to the vehicle computing device 120. The vehicle computing device 120 may receive the data request and may forward the request to the infotainment system while the vehicle 102 is off. The infotainment system may initiate according to the received priority and save the new preference settings.

As illustrated in FIG. 4A, the mobile device 104 may provide access to a plurality of applications. The applications may include a content application, such as first content application 440 and a second content application 442, as well as a vehicle application 446. As will be understood, the first content application 440 and the second content application 442 may provide internet radio and/or access to locally and/or remotely stored content. As an example, the first content application 440 may provide Pandora Radio™, Spotify™, SoundCloud™, iTunes™, iHeartRadio™, and/or access to locally stored content on the mobile device 104. The second content application 442 may provide a different content service, which may (or may not) be selected from the group listed above. The vehicle application 446 may provide options for the user to determine a priority of services for the vehicle 102 and/or other vehicles, as depicted in FIG. 4B.

As illustrated in FIG. 4B, the vehicle application 446 from FIG. 4A may provide a listing of the services that the infotainment system of the vehicle 102 provides. Additionally, the startup priority of the services may be provided, as well as other user settings. As an example, the vehicle application 446 may indicate whether the mobile device 104 and/or the vehicle application 446 will automatically link with the vehicle computing device 120 upon the user approaching the vehicle 102. Also provided is a listing of content applications that are linked with the vehicle application 446. As an example, if the first content application 440 is linked and the user approaches the vehicle 102, the vehicle application 446 may facilitate a wireless connection with the infotainment system (and/or vehicle computing device 120) to provide the content from the provider, via the mobile device 104, and to the infotainment system. The vehicle application 446 may also provide an indication regarding whether the vehicle application 446 automatically launches. An edit option 448 may also be provided for editing the services, the startup priority, and/or the user settings.

Figure 5:
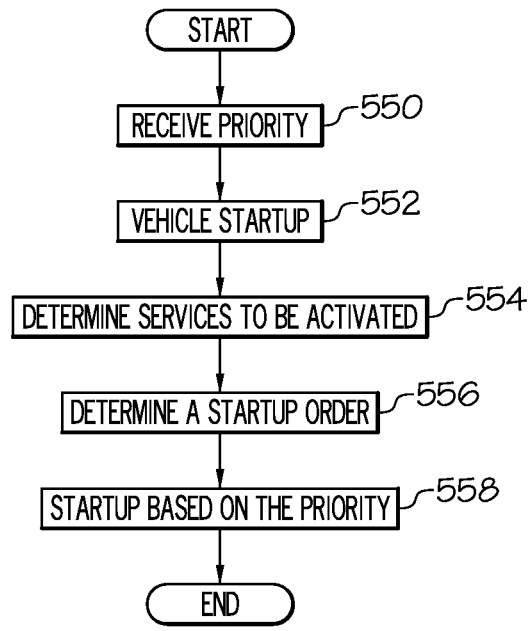
FIG. 5 depicts a flowchart for starting an infotainment system based on a user-defined priority, according to embodiments described herein.

FIG. 5 depicts a flowchart for starting an infotainment system based on a user-defined startup priority, according to embodiments described herein. As illustrated in block 550, a user defined startup priority associated with a plurality of vehicle service classifications that related to a plurality of respective vehicle services may be received. In block 552, an indication of vehicle startup may be received. As discussed above, some embodiments may be configured to determine if the user approaches the vehicle. In block 554, a determination regarding whether at least two of the plurality of vehicle services are to be activated in response to vehicle startup (and/or the user approaching the vehicle). In block 556, in response to determining that at least two of the plurality of vehicle services are to be activated, a startup order of the vehicle services may be determined, based on the startup priority. In block 558, a startup of the vehicle services may be performed, based on the startup priority.

Figure 6:
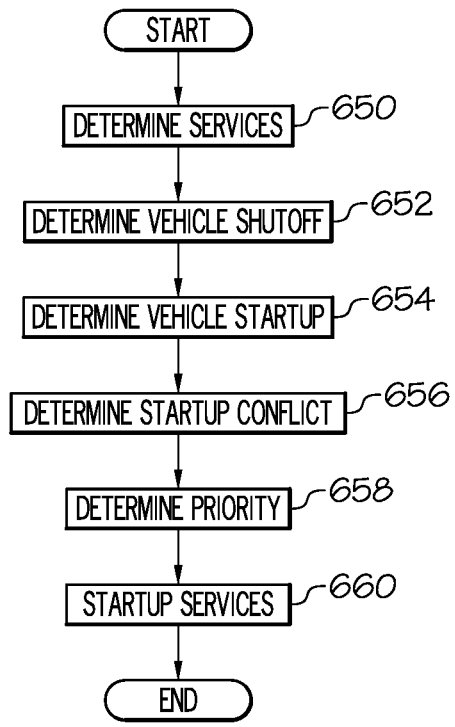
FIG. 6 depicts a flowchart for determining a user-defined startup priority and conflicts for an infotainment system, according to embodiments described herein.

FIG. 6 depicts a flowchart for determining a user-defined startup priority and conflicts for an infotainment system, according to embodiments described herein. As illustrated in block 650, a list of currently used services may be determined, stored. In block 652, vehicle shutoff and/or a user leaving the vehicle 102 may be determined. In block 654, a vehicle startup and/or a user approaching the vehicle 102 may be determined. In block 656, a determination may be made regarding whether the previously utilized services include a startup conflict. In block 658, in response to determining that there is a conflict, priority may be determined based on past user actions and/or a user selection. In block 660, the previously used services may be started, based on the startup priority.

Figure 7:
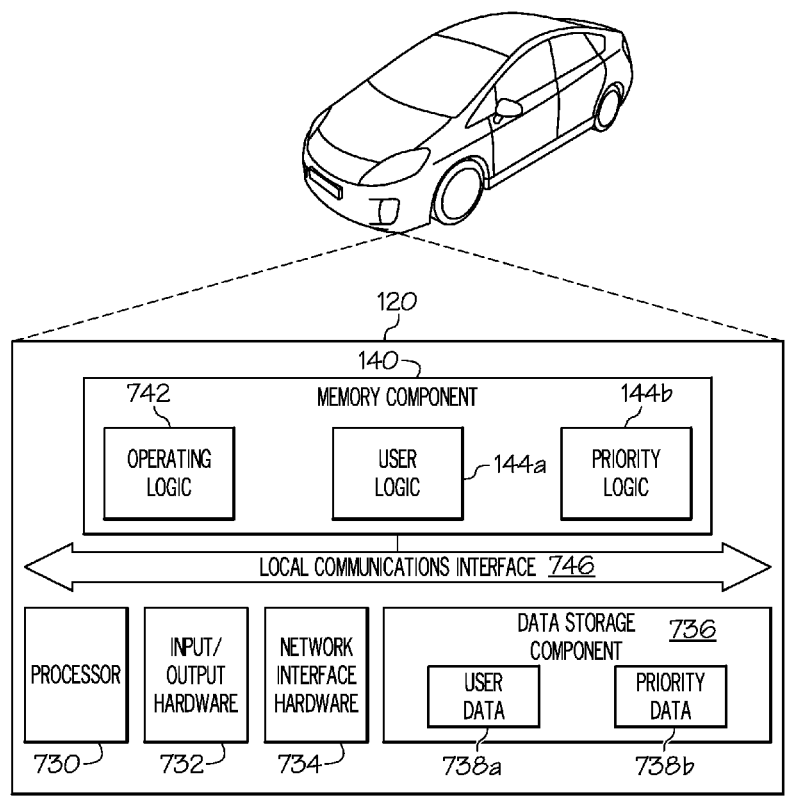
FIG. 7 depicts a vehicle computing device for determining a user-defined startup priority of an infotainment system, according to embodiments described herein.

FIG. 7 depicts a vehicle computing device 120 for determining a startup priority of an infotainment system, according to embodiments described herein. The vehicle 102 is depicted in FIG. 7 as an automobile but may be any passenger or non-passenger vehicle such as, for example, a terrestrial, aquatic, and/or airborne vehicle.

The vehicle computing device 120, which includes a processor 132, input/output hardware 708, the network interface hardware 750, a data storage component 736 (which stores user data 738*a*, priority data 738*b*, and/or other data), and the memory component 140. The memory component 140 may be configured as volatile and/or non-volatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle computing device 120 and/or external to the vehicle computing device 120.

The memory component 140 may store operating logic 742, the user logic 144*a* and the startup priority logic 144*b*. The user logic 144*a* and the startup priority logic 144*b* may each include a plurality of different pieces of logic, each of which may be embodied as a computer program, firmware, and/or hardware, as an example. A local interface 734 is also included in FIG. 7 and may be implemented as a bus or other communication interface to facilitate communication among the components of the vehicle computing device 120.

The processor 132 may include any processing component operable to receive and execute instructions (such as from a data storage component 736 and/or the memory component 140). As described above, the input/output hardware 708 may include and/or be configured to interface with the components of FIG. 7. As an example, the input/output hardware 708 may include microphones, speakers, the display 210, and/or other hardware in the vehicle 102

The network interface hardware 750 may include and/or be configured for communicating with any wired or wireless networking hardware, including an antenna, a modem, LAN port, wireless fidelity (Wi-Fi) card, WiMax card, Bluetooth chip, USB card, mobile communications hardware, and/or other hardware for communicating with other networks and/or devices. From this connection, communication may be facilitated between the vehicle computing device 120 and other computing devices, such as the mobile device 104.

The operating logic 742 may include an operating system and/or other software for managing components of the vehicle computing device 120. As also discussed above, the user logic 144*a* may reside in the memory component 140 and may be configured to cause the processor 132 to determine the user that has entered the vehicle 102 and/or provide the user interfaces described herein. Similarly, the startup priority logic 144*b* may be utilized to determine the startup priority of services and utilize that priority as described herein.

It should be understood that while the components in FIG. 7 are illustrated as residing within the vehicle computing device 120, this is merely an example. In some embodiments, one or more of the components may reside external to the vehicle computing device 120. It should also be understood that, while the vehicle computing device 120 is illustrated as a single device, this is also merely an example. In some embodiments, the user logic 144*a* and the startup priority logic 144*b* may reside on different computing devices. As an example, one or more of the functionality and/or components described herein may be provided by a remote computing device 106 and/or mobile device 104, which may be coupled to the vehicle computing device 120 via the network 100.

Additionally, while the vehicle computing device 120 is illustrated with the user logic 144*a* and the startup priority logic 144*b* as separate logical components, this is also an example. In some embodiments, a single piece of logic may cause the vehicle computing device 120 to provide the described functionality.

As illustrated above, various embodiments of providing infotainment system startup are disclosed. These embodiments allow the user to determine a priority of services for startup. By creating this priority, these embodiments allow the infotainment system to startup with the desired services being started first.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for providing infotainment system startup It should also be understood that these embodiments are merely exemplary and are not intended to limit the scope of this disclosure.

What is claimed is:

1. A method for providing infotainment system startup comprising:
   determining, by a vehicle computing device, a user-defined startup priority associated with a plurality of vehicle service classifications, wherein the plurality of vehicle service classifications each include at least one vehicle service of a plurality of vehicle services;
   receiving, by a vehicle computing device, an indication of vehicle startup;

determining, by a vehicle computing device, whether at least two of the plurality of vehicle services in at least two of the plurality of vehicle service classifications are to be activated in response to vehicle startup;

in response to determining that at least two of the plurality of vehicle services are to be activated in response to vehicle startup, determining, by a vehicle computing device, a startup order of the plurality of vehicle services, based on the user-defined startup priority; and initiating, by a vehicle computing device, startup of the plurality of vehicle services according to the startup order.

2. The method of claim 1, wherein the plurality of vehicle service classifications includes a media classification and a navigation classification and wherein the plurality of vehicle services includes at least one of the following: a navigation service, a wireless content service, a wired content service, and an in-vehicle content service.

3. The method of claim 1, further comprising:
providing a user interface that includes an user option identify the user-defined startup priority; and
receiving a user selection of the user option to identify the user-defined startup priority.

4. The method of claim 1, further comprising:
determining that a user has exited the vehicle;
determining the plurality of vehicle services that were being utilized prior to the user exiting the vehicle; and
storing the plurality of vehicle services for use in determining whether at least two of the plurality of vehicle services are to be activated in response to vehicle startup.

5. The method of claim 1, further comprising determining if startup of the plurality of vehicle services causes a conflict.

6. The method of claim 1, further comprising:
determining that a user has exited a previous vehicle;
determining the plurality of vehicle services that were being utilized prior to the user exiting the previous vehicle; and
storing the plurality of vehicle services for use in determining whether at least two of the plurality of vehicle services are to be activated in response to startup of the vehicle the user is starting, wherein the vehicle that the user is starting is different than the previous vehicle.

7. A system for providing infotainment system startup comprising:
an infotainment system that provides content to a vehicle, wherein the infotainment system comprises at least one of the following for receiving the content: a wireless communication interface and a wired communication interface; and
a vehicle computing device for the vehicle that stores logic that, when executed by a processor, causes the system to perform at least the following:
determine a plurality of vehicle services to initiate at vehicle startup;
determine a plurality of vehicle service classifications for the plurality of vehicle services;
determine in which of the plurality of vehicle service classifications each of the plurality of vehicle services reside;
determine a user-defined startup priority associated with the plurality of vehicle services;
receive an indication of vehicle startup;
determine whether there is a conflict regarding startup of the plurality of vehicle services that are in different vehicle service classifications;
in response to determining that there is a conflict, determine a startup order of the plurality of vehicle services to overcome the conflict, wherein the startup order is based on the user-defined startup priority; and
initiate startup of the plurality of vehicle services according to the startup order.

8. The system of claim 7, wherein the infotainment system is configured for providing the plurality of vehicle services, wherein the plurality of vehicle services includes at least one of the following: a navigation service, a wireless content service via the wireless communication interface, a wired content service via the wired communication interface, and an in-vehicle content service.

9. The system of claim 7, wherein the infotainment system further comprises a display, wherein the logic further causes the system to perform at least the following:
provide a user interface via the display that includes an user option identify the user-defined startup priority; and
receive a user selection of the user option to identify the user-defined startup priority.

10. The system of claim 7, further comprising a mobile device that communicates with the vehicle computing device to provide at least one of the plurality of vehicle services.

11. The system of claim 7, wherein the logic further causes the system to perform at least the following:
determine that a user has exited the vehicle;
determine the plurality of vehicle services that were being utilized prior to the user exiting the vehicle; and
store the plurality of vehicle services for use in determining whether at least two of the plurality of vehicle services are to be activated in response to vehicle startup.

12. The system of claim 7, further comprising a remote computing device for providing at least one of the plurality of vehicle services to the vehicle.

13. The system of claim 7, wherein the logic further causes the system to perform at least the following:
determine that a user has exited a previous vehicle;
determine the plurality of vehicle services that were being utilized prior to the user exiting the previous vehicle; and
sending data related to the plurality of vehicle services to a remote computing device for use in determining whether at least two of the plurality of vehicle services are to be activated in response to startup of the vehicle the user is starting, wherein the vehicle that the user is starting is different than the previous vehicle.

14. A system for providing infotainment system startup comprising:
an infotainment system that provides a plurality of current vehicle services for a vehicle; and
a vehicle computing device that is coupled to the infotainment system, wherein the vehicle computing device stores logic that, when executed by a processor, causes the system to perform at least the following:
communicate with a remote computing device to determine a plurality of past vehicle services that was previously utilized by a user;
determine, from the plurality of past vehicle services, the plurality of current vehicle services to initiate at vehicle startup;
determine a user-defined startup priority associated with the plurality of current vehicle services;

determine whether there is a conflict regarding startup of the plurality of current vehicle services;

in response to determining that there is a conflict, determine a startup order of the plurality of current vehicle services to overcome the conflict, wherein the startup order is based on the user-defined startup priority; and initiate startup of the plurality of current vehicle services according to the startup order, wherein the past vehicle services were provided by a different vehicle.

15. The system of claim 14, further comprising the remote computing device, wherein the logic communicates with the remote computing device to determine the plurality of past vehicle services.

16. The system of claim 15, further comprising a mobile device that stores a content application and a vehicle application, wherein the content application causes the mobile device to provide content to the infotainment system via at least one of the following: a wireless communication interface of the infotainment system and a wired communication interface of the infotainment system, and wherein the vehicle application causes the mobile device to provide the user setting associated with the infotainment system.

17. The system of claim 14, wherein the plurality of current vehicle services includes at least one of the following: a navigation service, a wireless content service via a wireless communication interface, a wired content service via a wired communication interface, and an in-vehicle content service.

18. The system of claim 14, wherein the infotainment system further comprises a display, wherein the logic further causes the system to perform at least the following:

provide a user interface via the display that includes an user option identify the user-defined startup priority; and receive a user selection of the user option to identify the user-defined startup priority.

19. The system of claim 14, wherein the logic further causes the system to store data related to the plurality of current vehicle services.

20. The method of claim 14, wherein the logic further causes the vehicle computing device to determine a plurality of vehicle service classifications for the plurality of vehicle services, and wherein the conflict can only occur between vehicle services that are in different vehicle service classifications.

\* \* \* \* \*